US008146014B2

(12) United States Patent
Zinn

(10) Patent No.: US 8,146,014 B2
(45) Date of Patent: Mar. 27, 2012

(54) CONTROLLING A MESSAGE DISPLAY IN AN ELECTRONIC DEVICE

(75) Inventor: Ronald Scotte Zinn, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1111 days.

(21) Appl. No.: 11/468,931

(22) Filed: Aug. 31, 2006

(65) Prior Publication Data

US 2008/0055284 A1 Mar. 6, 2008

(51) Int. Cl.
*G06F 3/14* (2006.01)
*G06F 3/17* (2006.01)

(52) U.S. Cl. ........ 715/810; 715/201; 715/205; 715/238; 709/202; 709/203; 709/206; 705/1; 382/229; 382/313; 340/286.07

(58) Field of Classification Search .......... 715/200–277; 700/701–799, 800–866; 709/201–229; 705/50–79; 345/30–111; 348/206–231.9
See application file for complete search history.

(56) References Cited

U.S. PATENT DOCUMENTS 5,247,438 A 9/1993 Subas et al.
5,528,745 A 6/1996 King et al.
5,692,125 A 11/1997 Schloss
5,790,974 A 8/1998 Tognazzini
6,016,478 A 1/2000 Zhang et al.
6,073,110 A 6/2000 Rhodes et al.
6,310,634 B1 10/2001 Bodnar et al.
6,323,883 B1 11/2001 Minoura et al.
6,684,088 B1 1/2004 Halahmi
7,221,800 B2 * 5/2007 Sesek et al. .................. 382/229
7,278,092 B2 * 10/2007 Krzanowski .................. 715/205
7,307,509 B2 * 12/2007 Chriss ...................... 340/286.07
7,325,198 B2 1/2008 Adcock et al.
7,451,158 B1 11/2008 Vogt et al.
7,457,773 B2 11/2008 Schmidt et al.
7,463,939 B1 12/2008 Mata et al.
7,512,454 B1 3/2009 Li et al.
7,533,147 B2 * 5/2009 Hosoi .......................... 709/206
7,562,287 B1 * 7/2009 Goldstein et al. ............ 715/201
7,593,605 B2 * 9/2009 King et al. .................... 382/313

(Continued)

FOREIGN PATENT DOCUMENTS

CA 2511101 A1 3/2006

(Continued)

OTHER PUBLICATIONS

Prasad S. K. et al.: "Implementation of a calendar application based on SyD coordination links" Parallel and Distributed Processing Symposium, 2003. Proceedings. International Apr. 22-26, 2003, Piscataway, NJ, USA, Apr. 22, 2003, pp. 242-249, XP010645361, ISBN: 978-0-7695-1926-5, Chapter 1 to 3.

(Continued)

*Primary Examiner* — Ruay Ho
(74) *Attorney, Agent, or Firm* — Perry + Currier Inc.

(57) ABSTRACT

A method of controlling a display of an electronic device for displaying a list of electronic messages. The method includes comparing a width of a designated space for a field of the electronic messages to a minimum width to determine if the width is sufficient, and if the width is determined to be sufficient, maintaining the width of the designated space, otherwise increasing the width of the designated space.

21 Claims, 9 Drawing Sheets

U.S. PATENT DOCUMENTS

| | | | | |
|---|---|---|---|---|
| 7,725,530 | B2 * | 5/2010 | Sah et al. | 709/203 |
| 2001/0030663 | A1 | 10/2001 | Nielsen et al. | |
| 2002/0154178 | A1 | 10/2002 | Barnett et al. | |
| 2003/0018724 | A1 | 1/2003 | Mathewson et al. | |
| 2003/0078982 | A1 | 4/2003 | Ogawa | |
| 2003/0130882 | A1 | 7/2003 | Shuttleworth et al. | |
| 2003/0149978 | A1 | 8/2003 | Plotnick | |
| 2004/0038705 | A1 | 2/2004 | Katayama | |
| 2004/0093290 | A1 | 5/2004 | Doss et al. | |
| 2004/0215472 | A1 * | 10/2004 | Gleckman | 705/1 |
| 2005/0120313 | A1 | 6/2005 | Rudd et al. | |
| 2005/0125737 | A1 | 6/2005 | Allen et al. | |
| 2005/0131992 | A1 * | 6/2005 | Goldstein et al. | 709/202 |
| 2005/0222971 | A1 | 10/2005 | Cary | |
| 2006/0009987 | A1 | 1/2006 | Wang | |
| 2006/0069604 | A1 | 3/2006 | Leukart et al. | |
| 2006/0095859 | A1 | 5/2006 | Bocking et al. | |
| 2006/0099945 | A1 | 5/2006 | Helvick | |
| 2006/0281489 | A1 | 12/2006 | Maack | |
| 2007/0055561 | A1 | 3/2007 | Perrella et al. | |
| 2007/0173993 | A1 | 7/2007 | Nielsen et al. | |
| 2008/0059881 | A1 | 3/2008 | Scott et al. | |
| 2008/0066018 | A1 | 3/2008 | Zinn et al. | |
| 2008/0141117 | A1 * | 6/2008 | King et al. | 715/238 |
| 2008/0167938 | A1 | 7/2008 | Meisels et al. | |
| 2008/0177609 | A1 | 7/2008 | Grieb et al. | |

FOREIGN PATENT DOCUMENTS

| | | | |
|---|---|---|---|
| EP | 0342140 | B1 | 11/1989 |
| EP | 0949559 | A | 10/1999 |
| EP | 1669914 | A | 6/2006 |
| GB | 2352846 | A | 2/2001 |
| WO | 0054177 | | 9/2000 |
| WO | 02/29542 | | 4/2002 |
| WO | WO 2005/076174 | A2 | 8/2005 |
| WO | 2005116892 | A | 12/2005 |

OTHER PUBLICATIONS

European Patent Application No. 08 17 2662 Search and Examination Report dated May 4, 2009.

Supplementary European Search Report; European Patent Application No. EP 06790612 dated Jul. 29, 2009.

Lee et al. “Integrated Multimedia E-mail Handler with Authoring Tool” in: High Performance Computing on the Information Superhighway HPC Asia Apr. 28-May 2, 1998, (pp. 517-522).

Microsoft Corp., Microsoft Outlook Screen Dumps, Microsoft Corp., SP2 Edition, Dec. 2003, pp. 1-6.

Canadian Patent Application No. 2,662,013 Office Action dated Jan. 28, 2011.

Smith, Leah, Examiner, Canadian Office Action, dated Feb. 6, 2012.

* cited by examiner

CONTROLLING A MESSAGE DISPLAY IN AN ELECTRONIC DEVICE

FIELD OF TECHNOLOGY

The present disclosure relates to electronic mail and to the control of a display of messages in an electronic device.

BACKGROUND

Portable electronic devices including, for example, smart telephones and wireless PDAs are becoming increasingly common and typically integrate functions of personal information management such as calendaring, data communications such as email, World Wide Web browsing and telecommunications in a single device. Such devices run on a wide variety of networks from data-only networks such as Mobitex and DataTAC to complex voice and data networks such as GSM/GPRS, CDMA, EDGE, UMTS AND CDMA2000 networks.

Portable electronic devices include a visual display such as a liquid crystal display (LCD) screen for presenting information to the user of the device. Of course, for many portable electronic devices, the size of the LCD screen is small so that the portable electronic device is handheld and is easily transported in, for example, a user's pocket. The displays of these handheld devices are used for displaying information to the user in the form of, for example, menus, lists and text displays. Many devices with electronic mail functionality provide a list of email message headers representing email messages sent from and/or received at the portable electronic device upon user selection of an email option from a menu screen. Each email header in these lists typically provides, for example, an indication of the status of the message to which the header relates, the time of the message, an address field and a subject field for the message. Of course with the limited size of the display screen, it is common that only portions of the address and subject fields are displayed.

The display of content on these devices is often customizable such that display attributes including font type and font size is user-selectable. To ensure that sufficient characters of the address and subject fields are displayed in an email header list so that the user is provided with some context relating to the message, the user is left to reduce the font size for display. With the reduction of font size, more characters can be displayed in each line of the list. For users who desire larger font sizes, often very little information regarding individual messages can be determined from the email header list.

BRIEF DESCRIPTION OF THE DRAWINGS

The embodiments described herein will be better understood with reference to the following Figures, in which.

DETAILED DESCRIPTION OF THE EMBODIMENTS

Figure 1:
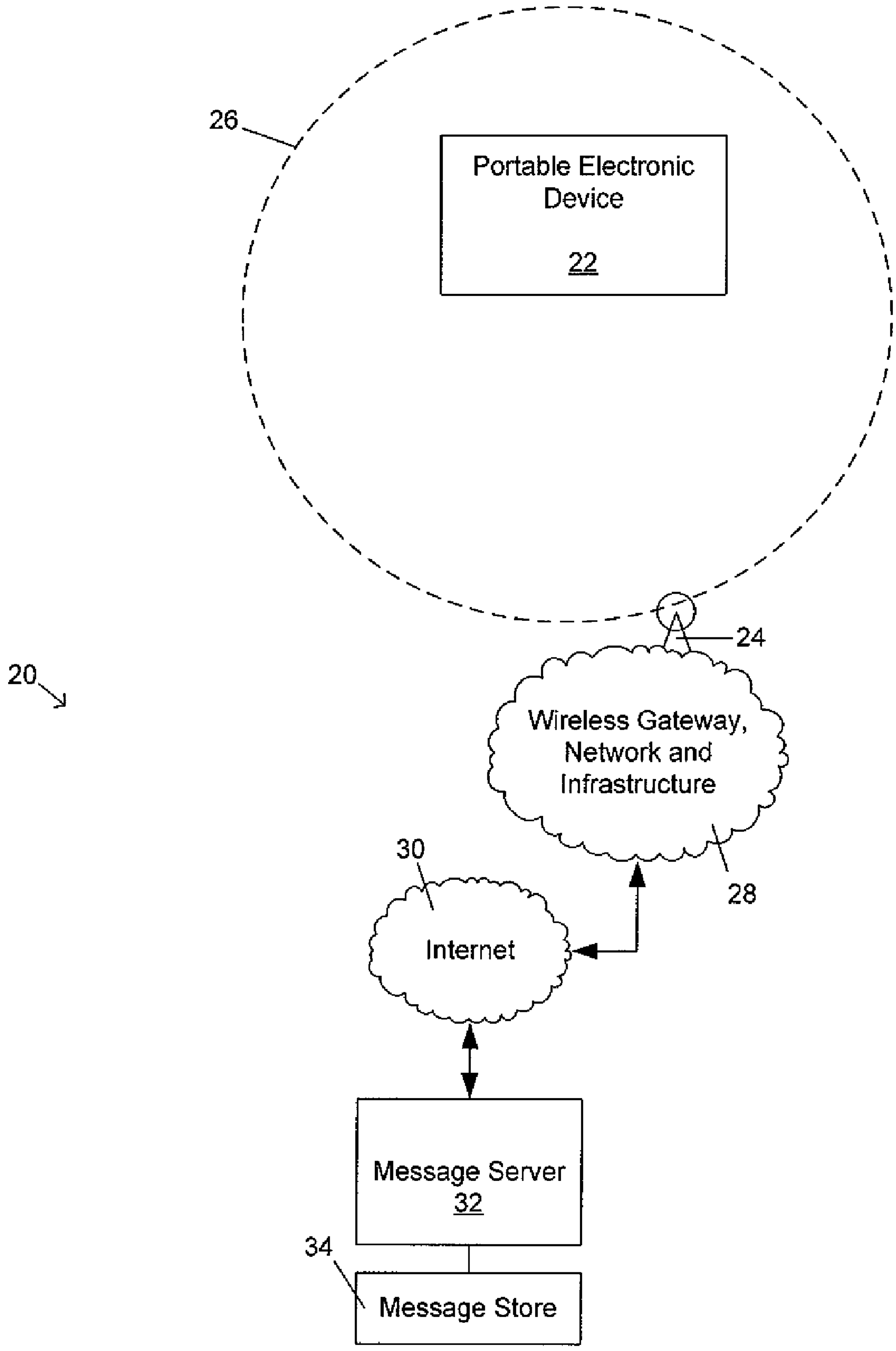
FIG. 1 is an overview of an exemplary communication system in which a portable electronic device according to one embodiment can be used.

Reference is first made to FIG. 1 which shows an overview of an exemplary communication system in which a portable electronic device 22 can be used. The communication system is indicated generally by the numeral 20 and the exemplary portable electronic device is indicated by the numeral 22. The communication system 20 provides for communications with portable electronic devices including the exemplary portable electronic device 22, as shown. The portable electronic device 22 and the communication system 20 are operable to effect communications over a radio communications channel therebetween. Data originating at the portable electronic device 22 is communicated to the communication system 20 by way of the radio communications channel. Similarly, data originating at the communication system 20 is communicated from the communication system 20 to the portable electronic device 22 by way of the radio communications channel, thereby providing data to the portable electronic device 22.

For the purpose of illustration, the communication system 20 is functionally represented in FIG. 1 and a single base station 24 is shown. The base station 24 defines a coverage area, or cell 26 within which communications between the base station 24 and the portable electronic device 22 can be effectuated. It will be appreciated that the portable electronic device 22 is movable within the cell 26 and can be moved to coverage areas defined by other cells that are not illustrated in the present example. The communication system 20 includes a base station 24 that is part of a wireless network and infrastructure 28 that provides a link to the portable electronic device 22. The wireless network and infrastructure 28 includes a number of base stations (not shown) that provide the other cells referred to above. Data is delivered to the portable electronic device 22 via wireless transmission from the base station 24. Similarly, data is sent from the portable electronic device 22 via wireless transmission to the base station 24.

Wireless networks and infrastructures include, for example, data-centric wireless networks, voice-centric wireless networks, or dual-mode wireless networks. For the purpose of the present exemplary embodiment, the wireless network and infrastructure 28 includes a dual-mode wireless network that supports both voice and data communications over the same physical base stations.

The wireless network and infrastructure 28 is connected through the Internet 30 to a message server 32, to thereby provide a link between the message server 32 and the portable electronic device 22. An email message is sent by an email sender connected somewhere to the Internet 30. Such email messages typically use traditional Simple Mail Transfer Protocol (SMTP), RFC 822 headers and Multipurpose Internet Mail Extension (MIME) parts to define the format of the email message. These techniques are known and are well understood by those skilled in the art. The email message arrives at the message server 32 and is stored in a message store 34. Many messaging systems rely on a "pull" system in which the portable electronic device requests that stored messages be forwarded by the message server 32 to the portable electronic device 22. On the other hand, in some systems, such messages are automatically forwarded by the message server 32 to the portable electronic device. Regardless of the system, the email is delivered to the portable electronic device 22 (either by automatic forwarding or by request).

Similarly, an email message sent from the portable electronic device 22 is sent to the message server 32, through the wireless gateway, network and infrastructure and the Internet. The message server 32 receives the email message and forwards the email message on based on the addressee.

Figure 2:
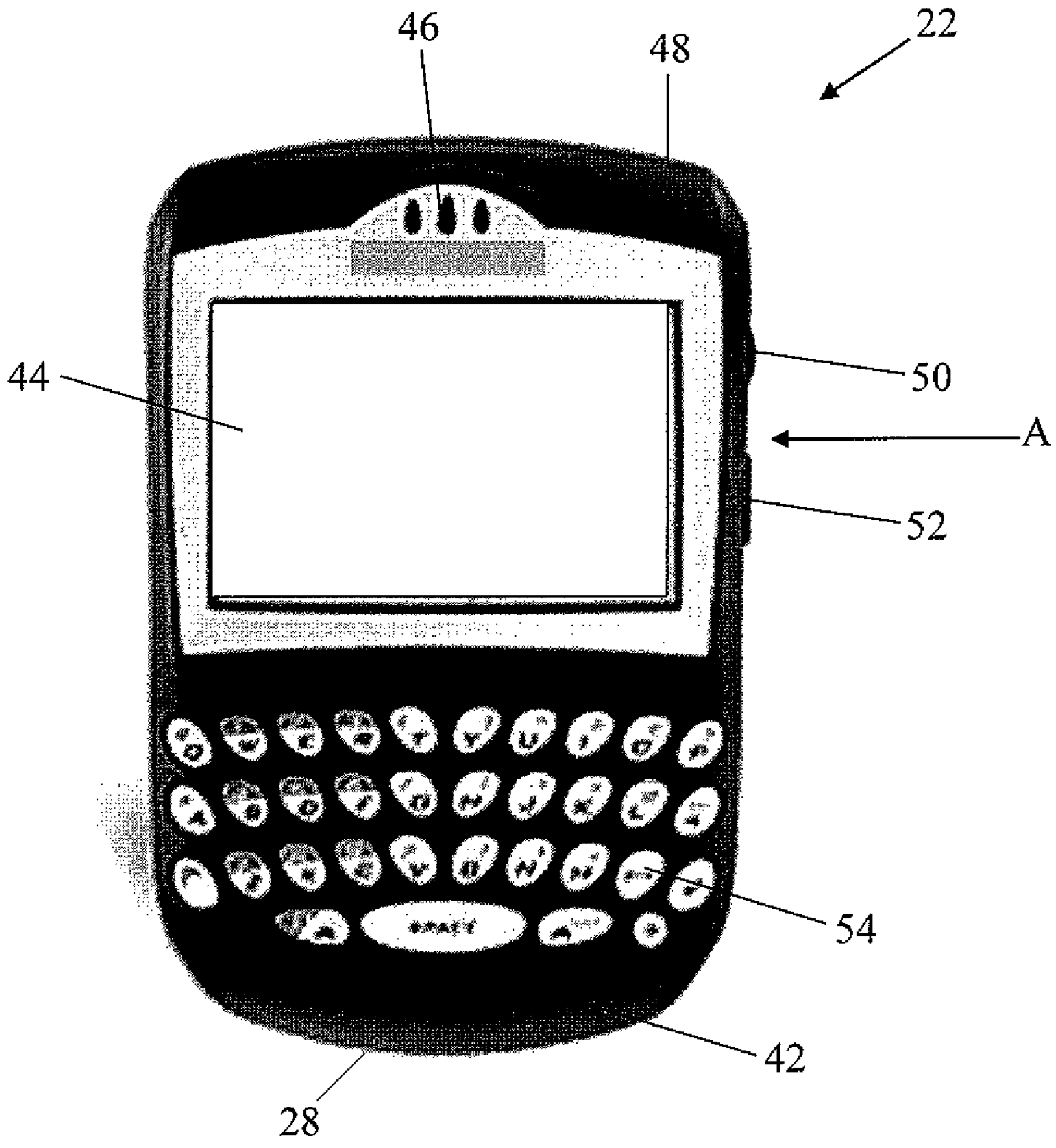
FIG. 2 is a front view of an exemplary portable electronic device.

Referring now to FIG. 2, there is shown an exemplary portable electronic device 22 for message display in accordance with an embodiment. In the present embodiment, the portable electronic device 22 is based on the computing environment and functionality of a hand-held wireless communication device. It will be understood, however, that the portable electronic device 22 is not limited to a hand-held wireless communication device. Other portable electronic devices are possible, such as cellular telephones, smart telephones, and laptop computers. Referring again to the present embodiment, the portable electronic device 22 includes a housing 42 that frames an LCD display 44, a speaker 46, an LED indicator 48, a trackwheel 50 or trackball (not shown), an exit key 52, a key pad 54, and a microphone 56. The trackwheel 50 and the exit key 52 can be inwardly depressed along the path of arrow "A" as a means to provide additional user-input. The housing 42 is made from a suitable material as will occur to those skilled in the art, and can be stored, for example, in a holster (not shown) that includes an attachment for attaching to a user's belt.

Figure 3:
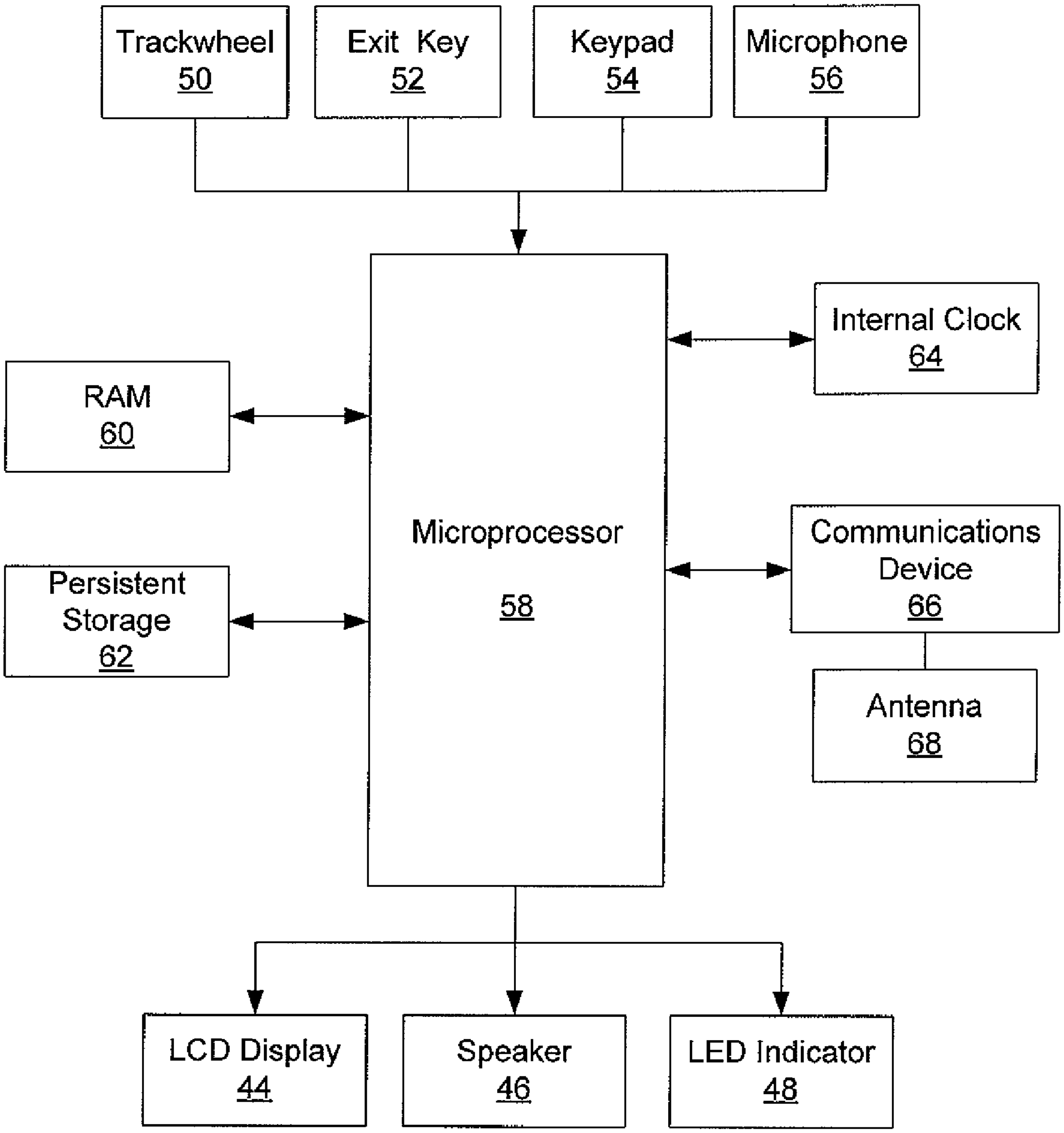
FIG. 3 is a block diagram of certain components, including internal components within the portable electronic device of FIG. 2.

Referring now to FIG. 3, a block diagram of certain components, including internal components within the portable electronic device 22, is shown. The portable electronic device 22 is based on a microcomputer that includes a microprocessor 58 connected to a random access memory (RAM) unit 60 and a persistent storage device 62 that is responsible for various non-volatile storage functions of the portable electronic device 22. Operating system software executable by the microprocessor 38 is stored in the persistent storage device 62, which in the present embodiment is flash memory. It will be appreciated, however, that the operating system software can be stored in other types of memory such as read-only memory (ROM). The microprocessor 58 receives input from various input devices including the trackwheel 50, the exit key 52, and the keypad 54, and outputs to various output devices including the LCD display 44, the speaker 46 and the LED indicator 48. The microprocessor 58 is also connected to an internal clock 64.

In the present embodiment, the portable electronic device 22 is a two-way RF communication device having voice and data communication capabilities for communication with the communications system 20 as referred to above. Two-way RF communication is facilitated by a communications device 66 that is used to connect to and operate with the communication system 20, via the antenna 68.

For data communication, signals are received, for example, an email message, at the communications device 66, processed and sent to the microprocessor 58 where the signals are further processed for display on the LCD display 44. Data, such as an email message can also be composed using one or more of the input devices such as the key pad 54 or the trackwheel 50. The data is sent through the communications device 66 to the network to which the portable electronic device 22 connects.

Although not shown, a battery provides power to all active elements of the portable electronic device 22.

The persistent storage device 62 also stores a plurality of applications executable by the microprocessor 58 that enable the portable electronic device 22 to perform certain operations including the communication operations referred to above. Other applications software is provided including, for example, an email application, a Web browser application, an address book application, calendar applications, a profiles application, and others.

It will be appreciated that email messages are received at the portable electronic device 22 by data communication through the communication system 20 referred to above. Email messages are also sent from the portable electronic device 22 by data communication through the communication system 20 referred to above. Each email message that is received and that is sent includes a variety of information including a date, a time, address information, subject information, a priority indication, and an email body.

Figure 4:
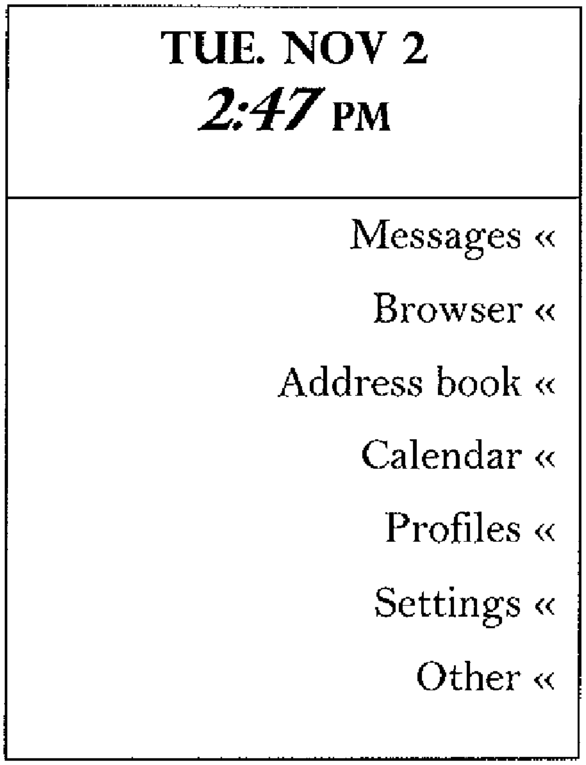
FIG. 4 is an exemplary menu screen displayed on a display of the portable electronic device of FIG. 2.

Referring to FIG. 4, there is shown an exemplary menu screen that is displayed on the LCD display 44 of the portable electronic device 22. The exemplary menu screen includes a display clock that is updated according to the internal clock 64, and applications including an email messaging application, a Web browser, an Address book, and a Calendar application. A Settings option and an Other option are also provided. Each of the displayed applications are selectable by, for example, scrolling to the desired application using the trackwheel 50 and pressing inwardly on the trackwheel 50 in the direction of arrow "A".

Figure 5:
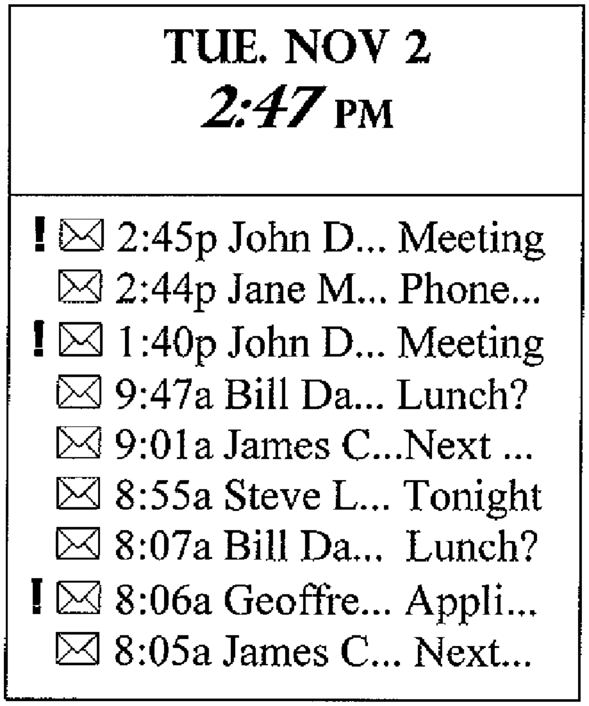
FIG. 5 is an exemplary list of email messages displayed on the display of the portable electronic device of FIG. 2.

Selection of the email messaging application causes execution of the email messaging application by the microprocessor 58 and a list of email messages is displayed including previously sent and received, opened and unopened email messages that remain stored on the portable electronic device 22. It will be appreciated that the list of email messages displayed on the portable electronic device 22 is not limited to all messages sent and received that remain on the portable electronic device 22. It is possible that the list of sent email messages and received email messages are displayed in separate lists and that only one of these lists, such as the list of email messages received at the portable electronic device 22, is displayed upon selection of the email message application. The list of email messages is referred to as the list of email headers. Each email message that is sent from the portable electronic device 22 and received at the portable electronic device 22 is represented by a header in the list. An exemplary list of email messages sent and received is shown in FIG. 5. It will be appreciated that email headers typically include priority information, the time, address information and subject information, as shown in FIG. 5. The email header is not limited to this information. Other information can also be displayed in each email header. It will be appreciated that the attributes of the email header are user-selectable for user selection of, for example, a font size, font and colour for display.

Figure 6:
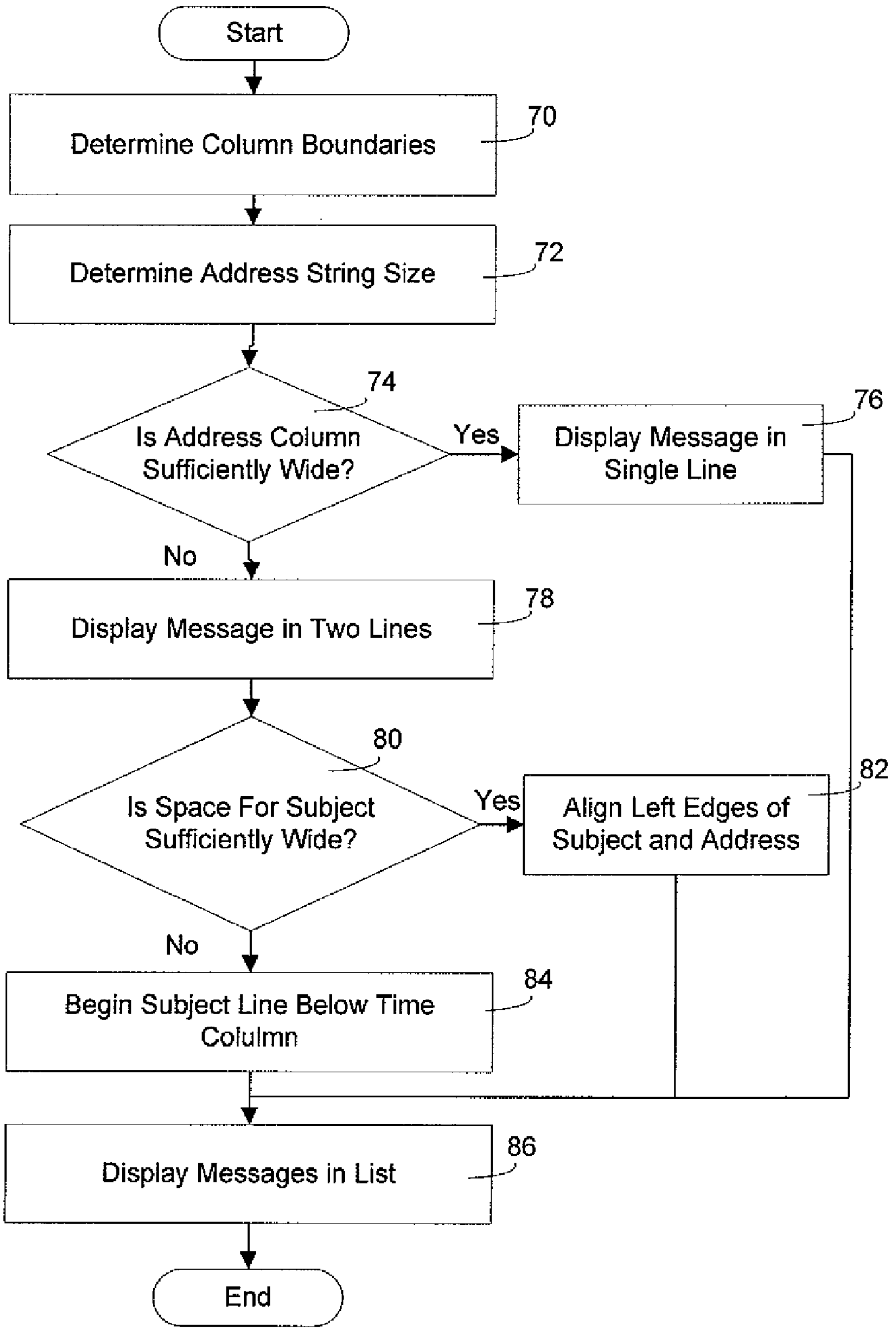
FIG. 6 is a flowchart showing the steps in a method for controlling a display in an electronic device according to an embodiment.

Reference is now made to FIG. 6 to describe an embodiment of the present application. It will be appreciated that each of the steps of FIG. 6 are carried out by routines and subroutines of software executed by the microprocessor 58. Coding of software for carrying out the steps in FIG. 6 is well within the scope of a person of ordinary skill in the art. In the present embodiment, each email header includes fields that indicate the priority, status (opened or unopened), time, address information and subject information. It will be appreciated that portions of, for example the address field or the subject field or both the address and subject fields are not shown due to the length of the strings for display or due to the font size chosen for display in the email header list. Columns define the designated space for display of each of the fields of an email header. Thus, the screen of the LOD display 44 is divided into columns in which respective fields of the email header are displayed.

According to the present embodiment, the priority, the status and the time for each email are always displayed in full on the portable electronic device 22. Thus, the columns designated for the priority, the status and time for each email in the header list varies depending on font size chosen for the display. Therefore the space remaining for display of the address field and the subject field also varies. Clearly the width of each designated space for each field is dependent on the size of the font chosen. With large fonts, the column widths for the address and subject fields are smaller as the column width for the time field, for example, is larger to show the time in full.

Upon selection of the "Other" option of the exemplary menu screen of FIG. 4, the user is presented with a number of possible options. Options provided include display options for font attributes including font family, font size and font style. Other options can also be provided. Upon selection of the font family, the user is provided with a number of different font types to choose from. Similarly, upon selection of the font size, the user is provided with a number of different font sizes to choose from. Upon selection of the font style option, the user is provided with a number of different font styles, such as normal, bold, extra bold, italic and others. It will be appreciated that a change in font size results in a change in the column width for the address and subject fields, with larger fonts leading to smaller column width. Similarly, changes in font family or font style can also result in changes to the column width for the address and subject fields in the email list.

With changes to any one of these options of font family, font size and font style, the microprocessor 58 executes a process to determine the display characteristics for the email header list. First, the boundaries for each column of the email headers are determined based on the user-selected font attributes chosen for display (step 70). The process can also be executed by the microprocessor 58 at any other suitable time, such as at start up of the portable electronic device 22.

Next, the microprocessor 58 determines the width of a test case string for the address column (step 72). Any suitable string can be used for a test case. For example, the string chosen can be "Suitable?". The width of the test case string for the email message is then compared to the width of the address column based on the boundaries determined at step 70, and a decision as to how to display the email message header is made (step 74). In other words, it is determined whether the column width is sufficient for the test case, "Sufficient?", to fit within the column provided. If the width of the test case string is smaller to or equal to the width of the address column, then the decision is made to display the email message headers in a single line of the email message header list (step 76). Thus, when the test case string fits within the designated column space, the email message header is displayed on a single line in the list. On the other hand, if the width of the test case string is larger than the width of the address column, a decision is made to display each of the email message headers on two lines in the list (step 78). Thus, if the test case string does not fit within the designated column space, each of the email message headers is displayed on two lines in the list.

When a decision is made to display each of the message headers on two lines in the list, the subject column is moved to the second line for each of the email headers while the priority, the status, the time and the address are displayed in the first line of the email header. Thus, the width of the designated space for display of the address field is effectively increased to the remainder of the width of the display 44 (full width minus the width of the columns for priority, status, and time). Thus, the address column left edge remains the same, while the address column right edge on the display 44 is extended to the right edge of the display 44.

In the present embodiment, the subject column is indented on the second line of the display. This allows the user to more clearly distinguish between email message headers in the list. The left edge of the second line of each email message header is determined based on the left edge of the address column in the first line of the email message header. The left edge of the address column in the first line of the email message header is compared to the full display width, and a determination is made based on this comparison (step 80). If the left edge of the address column falls within a first predetermined portion of the display 44, the left edge of the subject field space is aligned with the left edge of the address field space (Step 82). In the present embodiment, the left edge of the subject field space is aligned with the left edge of the address field space if the left edge of the address field space falls within, for example, the first (left) 30 percent of the display 44. It will be appreciated that 30 percent is used for exemplary purposes only, and that any suitable percentage or a measurement in pixels can be used.

If, on the other hand, the left edge of the address field space does not fall within the first predetermined portion of the display 44, the left edge of the subject field space is, for example, aligned with the midpoint of the time field column in the first line of the message header (step 84). It will be appreciated that user selection of a very large font for display results in the left edge of the address field space failing outside the first predetermined portion of the display 44. Thus, the left edge of the subject field space is shifted left to provide more space for the subject field for each message header.

When the email message header list is provided to the user, for example, upon selection of the email messaging application from the menu screen shown in FIG. 4, each of the email message headers are displayed (step 86) in accordance with the determinations made at steps 74 and 80.

Figure 7:
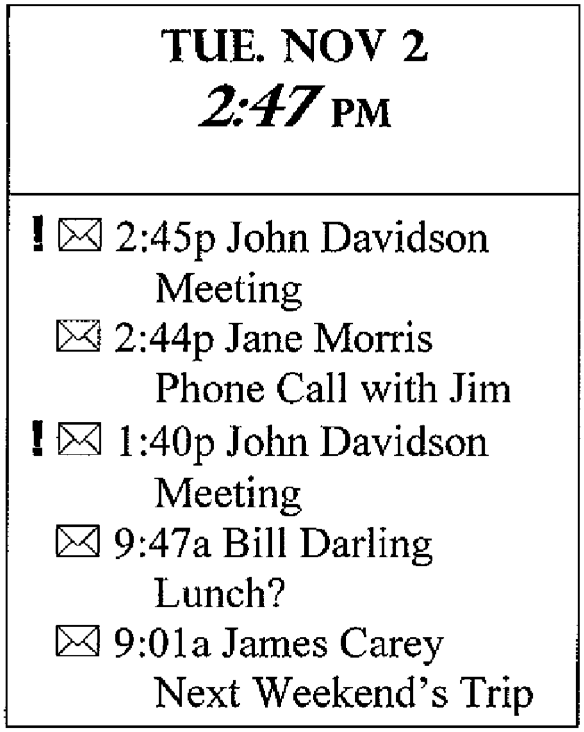
FIG. 7 is an exemplary screen showing a message list displayed on the display of the portable electronic device.

Reference is now made to FIG. 7 to show an exemplary email message header list displayed in accordance with an embodiment of the present application. As shown, the user-selected font size is large so that the test case string does not fit into the designated space in the address column. Thus, upon selection of the font size, the subject field is moved to the next line of the list, thereby increasing the width of the designated space for display of the address field. In this example, the font is so large that the left edge of the address field is outside of the first predetermined portion of the display. Thus, rather than aligning the left edge of the subject field with the left edge of the address field, the subject field is shifted left to align with the midpoint of the time column.

Figure 8:
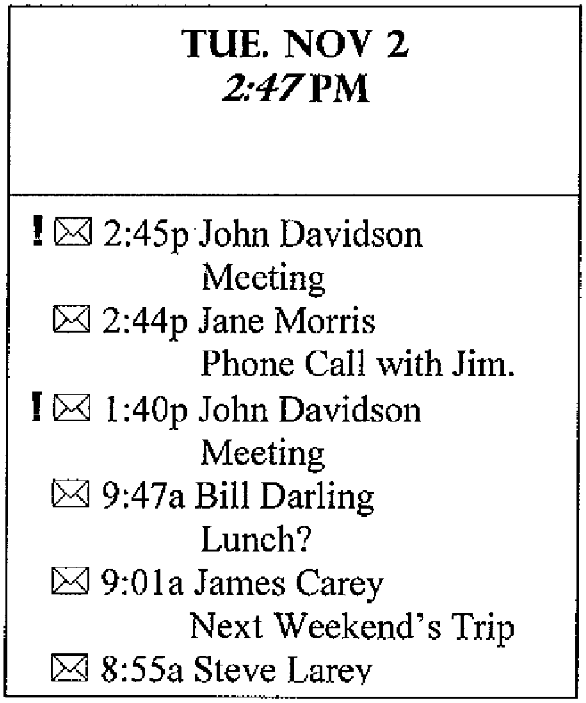
FIG. 8 is another exemplary screen showing a message list displayed on the display of the portable electronic device.

Referring now to FIG. 8, another exemplary email message header list displayed in accordance with an embodiment is shown. In the present example, the user-selected font size is smaller than the user-selected font size shown in the example of FIG. 7. The test case string, however, is determined not to fit in the designated space in the address column. Thus, upon selection of the font size, the decision is made to move the subject field to a second line in the email message header list. In this example, the font size is small enough that the left edge of the address field space falls within the first predetermined portion of the display. Accordingly, the left edge of the subject field is aligned with the left edge of the address field.

Figure 9A:
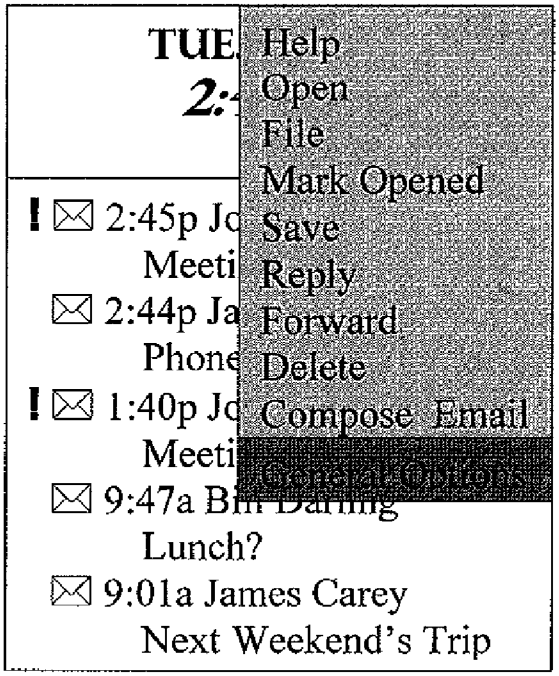
FIG. 9A is an exemplary menu screen showing user options for email.
Figure 9B:
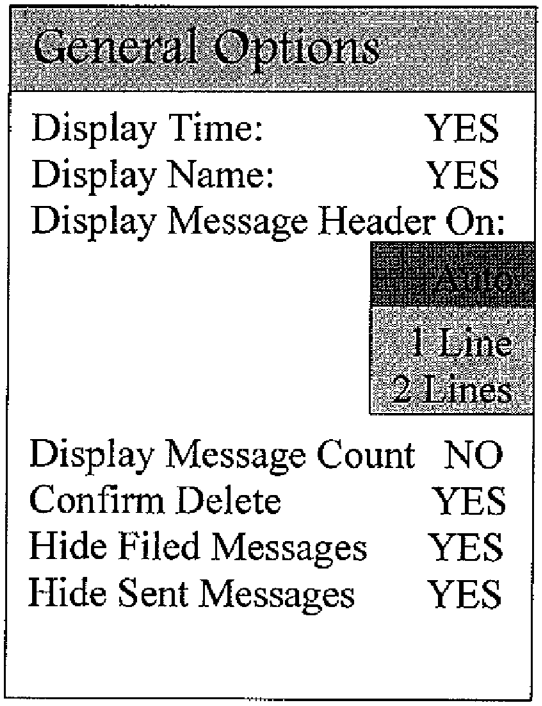
FIG. 9B is an exemplary submenu showing user options for display of the email message header list.

Referring now to FIGS. 9A and 9B, an exemplary menu showing user options for email and an exemplary submenu showing user options for display of the email message header list, respectively, are shown. Using the exemplary menu and submenu, the user can optionally switch the email message header list to the automatic determination of one or two lines of display for each email header as described above. The user can also optionally switch to a single line of display for all email headers or switch to two lines of display for all email headers. To switch between the email message header display types, the user presses inwardly on the trackwheel 50, in the direction of arrow "A" when the email message headers are displayed, causing display of the email options menu shown in FIG. 9A. User selection of General Options from the email options menu of FIG. 9A gives rise to display of the General Options submenu of FIG. 9B. From this submenu, the user selects the option of Auto, 1 line or 2 lines for display of the email message header. Thus, it is contemplated that the user can switch between display modes.

While the embodiments described herein are directed to particular implementations of the method for displaying an electronic message in a list on a display of an electronic device and to the electronic device, it will be understood that modifications and variations to these embodiments are within the scope and sphere of the present application.

Figure 10:
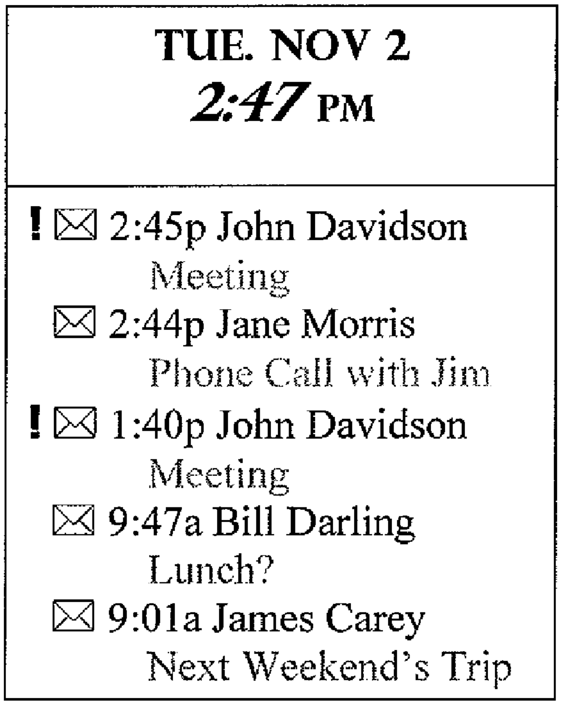
FIG. 10 is yet another exemplary screen showing a message list displayed on the display of the portable electronic device.
Figure 11:
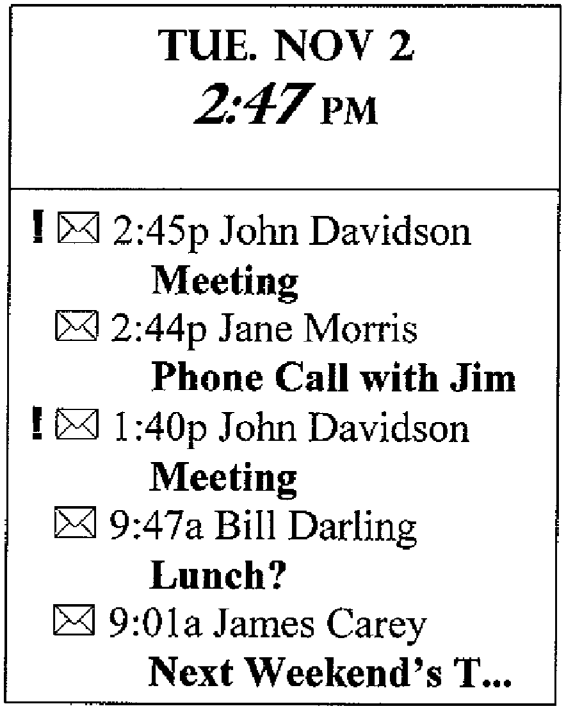
FIG. 11 is still another exemplary screen showing a message list displayed on the portable electronic device.

In one exemplary embodiment, the user of the device is provided with user-selectable attribute options for display of the second line of the header list when the device is in Auto or 2 lines header mode. Thus, the user can select an alternative attribute such as an alternative font family, font size, font style, or colour for email headers when the subject field appears on a second line. Referring to FIG. 10, there is shown an exemplary email header list, similar to that shown in FIG. 7. In the present example, however, the second line of each email header is shown in grey, as selected by the user. Referring to FIG. 11, there is shown another exemplary email header list similar to that shown 7. In the present example, however, the second line of each email header is shown in bold, as selected by the user. In each of these examples, the user selects the attributes for the second line for the second line of the email message headers in the list.

In the first described embodiment, the decision as to whether or not to display the subject field on the next line is made based on a comparison of the test case string width with the designated width of the address column. In another embodiment, the decision as to whether or not to display the subject field on the next line is made based on a comparison of a test case string width with the designated width of the subject column. In still another embodiment, the subject field is returned to the first line of the display when all email messages in said list have been opened by the user.

Figure 12:
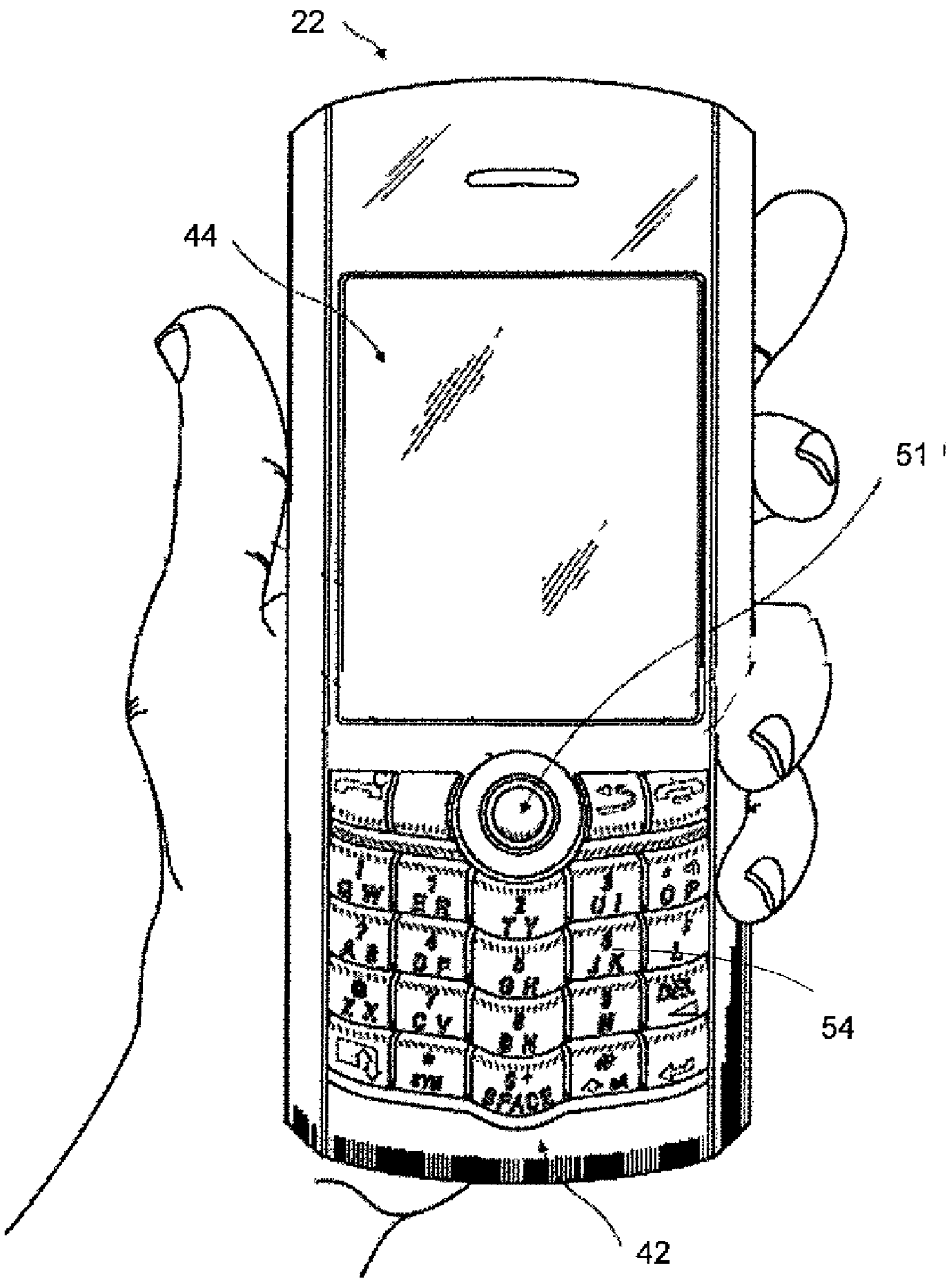
FIG. 12 is a front view of another exemplary portable electronic device.

It will be appreciated that the portable electronic device of FIG. 2 is shown for exemplary purposes only. Other portable electronic devices such as that shown in FIG. 12 are possible. Referring to FIG. 12, another exemplary portable electronic device 22 is shown. The portable electronic device 22 includes a housing 42 that frames an LCD display 44. In the present example, however, the portable electronic device 22 includes a trackball 51, rather than a trackwheel. The trackball 51 can be depressed as a means to provide additional user-input. The microprocessor 58 receives input from the trackball 51 which is used for user selection of features from a list or a table on the LCD display 44 of the portable electronic device 42. Selection is carried out by rolling the trackball to roll a cursor (or highlighted region), for example, to the desired selection and pressing inwardly on the trackball. The portable electronic device 22 shown in FIG. 12 includes many other features, including, for example, a key pad 54 and other features similar to those described above with reference to FIG. 9. It will also be appreciated that reference is made to a trackwheel in the above description for exemplary purposes only, and a trackball 51 such as that shown in FIG. 12 can be used.

Thus, according to one aspect, there is provided a method of controlling a display of an electronic device for displaying a list of electronic messages. The method includes comparing a width of a designated space for a field of the electronic messages to a minimum width to determine if the width is sufficient, and if the width is determined to be sufficient, maintaining the width of the designated space, otherwise increasing the width of the designated space.

According to another aspect, there is provided an electronic device. The electronic device includes a memory for storage of electronic messages, a communications device for receiving and sending the electronic messages, a display device for displaying the electronic messages in a list, a user input device for user selection and manipulation of the electronic messages, and a processor for comparing a width of a designated space for a field of the electronic messages to a minimum width to determine if the width is sufficient. If the width is determined to be sufficient, the width of the designated space is maintained, otherwise the width of the designated space is increased.

According to yet another aspect, there is provided a computer program product for displaying an electronic message in a list on a display of an electronic device. The computer program product includes a computer-readable medium having computer-readable code embodied therein for comparing a width of a designated space for a field of the electronic messages to a minimum width to determine if the width is sufficient and if the width is determined to be sufficient, maintaining the width of the designated space, otherwise increasing the width of the designated space.

Advantageously, when there is not enough room for one of the fields of a message header, more room is made available for this field. This is accomplished by automatically switching from a single line in the display to multiple lines. This switching provides a larger space for address and subject fields of the message header. When a message header is switched to multiple lines of the display, a large portion of the screen width is provided for displaying an address field on the first line of the message header. Similarly, a large portion of the screen width is provided for displaying a subject field on a second line of the message header. In another advantage, the address and subject fields can be aligned when it is determined that sufficient space is provided and can automatically be switched such that the subject field is provided more space, thereby moving the subject field to the left, out of alignment with the address field if the subject field does not fit in the space provided when in alignment.

Many alternatives and variations to the above-described embodiments are possible, for example, many of the options provided in the submenus and the displayed details in the screens shown in the Figures are provided for exemplary purposes and such options and details can vary.

Still many other modifications and variations may occur to those skilled in the art. All such modifications and variations are believed to be within the sphere and scope of the present application.

The invention claimed is:

1. A method of controlling a display of an electronic device for displaying a list of electronic messages, the method comprising:

comparing a width of a designated space for displaying data from a field of said electronic messages to a designated column width for an address field to determine if said width is sufficient;

if said width is determined to be sufficient, maintaining said width of said designated space, otherwise increasing said width of said designated space; and displaying said list with said data displayed in said designated space for each of said electronic messages.

2. The method according to claim 1, wherein said width is determined to be sufficient if a test case string fits within said designated space.

3. The method according to claim 2, wherein said comparing comprises comparing a given width of said test case string to said designated column width for said address field.

4. The method according to claim 1, comprising determining said width of said designated space prior to said comparing.

5. The method according to claim 1, wherein if said designated space for said field is determined to be insufficient, said method further comprises for each electronic message of said list, displaying said field on one line and displaying a further field on a next line in said list.

6. The method according to claim 5, wherein said displaying said field on one line comprises displaying an address field on said one line and said displaying said further field comprises displaying said subject field on said next line in said list.

7. The method according to claim 5, wherein said displaying said further field comprises determining a left edge of said field in said one line in relation to said display of said electronic device and locating a left edge of said further field on said next line based on said left edge of said field in said one line.

8. The method according to claim 7, wherein if said left edge of said field in said one line falls within a predetermined first portion of said display of said electronic device, said further field is located to align the left edge of said further field with said left edge of said field in said one line.

9. The method according to claim 8, wherein if said field in said one line does not fall within said predetermined first portion of said display of said electronic device, said further field is located such that said left edge of said further field is left of alignment with said field in said one line.

10. The method according to claim 5, wherein displaying said field in said one line comprises displaying said field in said one line with a first display attribute and displaying said further field on said next line comprises displaying said further field with a second display attribute.

11. The method according to claim 10 wherein said first display attribute comprises at least one of font family, font size, font style and colour, and said second display attribute comprises at least one of font family, font size, font style and colour.

12. The method according to claim 5, further comprising displaying all said fields of one of said electronic messages on a single line in said list after user opening of said one of said messages.

13. An electronic device comprising:

a memory for storage of electronic messages;

a communications device for receiving and sending said electronic messages;

a display device for displaying said electronic messages in a list;

a user input device for user selection and manipulation of said electronic messages; and a processor for comparing a width of a designated space for displaying data from a field of said electronic messages to a designated column width for an address field to determine if said width is sufficient, if said width is determined to be sufficient, maintaining said width of said designated space, otherwise increasing said width of said designated space, and causing said display device to display said list with said data displayed in said designated space for each of said electronic messages.

14. The electronic device according to claim 13, wherein if a test case string does not fit within said designated space, said processor causes said display device to display said field in one line and to display a further field on a next line for each of said electronic messages in said list.

15. The electronic device according to claim 14, wherein said processor causes said field in said one line to be displayed with a first display attribute and said further field to be displayed with a second display attribute.

16. The electronic device according to claim 13, wherein said designated space for said field comprises a column for said address field in said list.

17. The electronic device according to claim 16, wherein if said test string does not fit within said column, said processor causes said display device to display a subject field on a next line in said list.

18. The electronic device according to claim 17, wherein said processor causes a left edge of said subject field to be displayed in a location on said next line based on a left edge of said address field in said one line.

19. The electronic device according to claim 18, wherein said processor causes said left edge of said subject field to be displayed in alignment with said left edge of said address field when said left edge of said address field falls within a predetermined first portion of said display device of said electronic device, and said processor causes said left edge of said subject field to be displayed to the left of alignment with said left edge of said address field when said left edge of said address field does not fall within said predetermined first portion of said display device of said electronic device.

20. A computer program product for displaying a list of electronic messages on a display of an electronic device, said computer program product comprising a computer-readable medium having computer-readable code embodied therein for:

comparing a width of a designated space for displaying data from a field of said electronic messages to a designated column width for an address field to determine if said width is sufficient;

if said width is determined to be sufficient, maintaining said width of said designated space, otherwise increasing said width of said designated space; and displaying said list with said data displayed in said designated space for each of said electronic messages.

21. A method of controlling a display of an electronic device for displaying a list of electronic messages, the method comprising:

comparing a width of a designated space, for displaying data from an address field of said electronic messages, to a designated column width for an address field determine if said width is sufficient for displaying said data;

if said width is determined to be sufficient, maintaining said width of said designated space, otherwise increasing said width of said designated space to a remainder of a width of said display such that said data can be displayed; and displaying said list with said data displayed in said designated space for each of said electronic messages.

* * * * *